US011788486B2

United States Patent
Heinrich et al.

(10) Patent No.: US 11,788,486 B2
(45) Date of Patent: Oct. 17, 2023

(54) MODULE FOR DETECTING A LEAKAGE OF AN ARRANGEMENT

(71) Applicant: Eagle Actuator Components GmbH & Co. KG, Heppenheim (DE)

(72) Inventors: Ralf Heinrich, Schwegenheim (DE); David Daenhardt, Mannheim (DE); Christiane Spilger, Fürth (DE); Peter Lexa, Einhausen (DE); Klaus Bickel, Hammelbach (DE)

(73) Assignee: Eagle Actuator Components GmbH & Co. KG, Heppenheim (DE)

( * ) Notice: Subject to any disclaimer, the term of this patent is extended or adjusted under 35 U.S.C. 154(b) by 0 days.

(21) Appl. No.: 17/965,595

(22) Filed: Oct. 13, 2022

(65) Prior Publication Data

US 2023/0139015 A1    May 4, 2023

(30) Foreign Application Priority Data

Nov. 4, 2021   (DE) .......................... 102021128688.3

(51) Int. Cl.
  *F02D 41/22*  (2006.01)
  *F02M 25/08*  (2006.01)
  *G01M 3/32*   (2006.01)

(52) U.S. Cl.
  CPC ........... *F02D 41/22* (2013.01); *F02M 25/089* (2013.01); *F02M 25/0818* (2013.01); *G01M 3/3236* (2013.01); *B60Y 2306/15* (2013.01); *F02D 2041/225* (2013.01)

(58) Field of Classification Search
  CPC ................ B60Y 2306/15; F02D 41/22; F02D 2041/225; F02M 25/0818; F02M 25/089; G01M 3/3236
  See application file for complete search history.

(56) References Cited

U.S. PATENT DOCUMENTS

| 7,347,082 B1 * | 3/2008 | Kohn ................. F02M 25/0818 73/40 |
| 9,261,054 B2 * | 2/2016 | Peters ................ F02M 25/0818 |
| 9,897,043 B2 * | 2/2018 | Nakagawa ......... F02M 25/0818 |

(Continued)

FOREIGN PATENT DOCUMENTS

EP          1895144 A1 *  3/2008  ......... F02M 25/0809

*Primary Examiner* — Phutthiwat Wongwian
*Assistant Examiner* — Mark L. Greene
(74) *Attorney, Agent, or Firm* — VOLPE KOENIG P.C.; Daniel E. Rose (57) ABSTRACT

A module (14) for detecting a leakage, comprising a pressure sensor (8) and a pump (2) for generating pressure, is characterized in that, regarding the object of detecting and/or quantifying a leakage of an arrangement which has a large sealed volume, in a reliable manner with a compact device, the module (14) has a sealable reference volume (11) which can be connected in terms of flow by means of a valve (9) to a tank connection (10) and which can be disconnected therefrom in a flow-tight manner, wherein the pressure inside the reference volume (11) can be detected by the pressure sensor (8), wherein pressure can be generated inside the reference volume (11) by means of the pump (2) and wherein the reference volume (11) can be connected in a flow-conducting manner by means of a shut-off valve (4) via a reference aperture (5) with a defined flow cross section to an atmosphere outlet (1) and can be disconnected therefrom.

12 Claims, 6 Drawing Sheets

(56) References Cited

U.S. PATENT DOCUMENTS

2003/0192370 A1   10/2003  Amano et al.
2015/0082866 A1    3/2015  Pearce et al.
2023/0095906 A1*  3/2023  Harriger .............. F02M 25/089
                                                         73/114.39

* cited by examiner

| Phase | Valve Switching State | | Pump | Next Phase After |
|---|---|---|---|---|
| | Changeover Valve | Shut-off Valve | | |
| S1 | Tank-Atmosphere | Closed | Off | Timeout |
| S2 | Tank-Atmosphere | Closed | On | Excess pressure or Timeout |
| S3 | Tank-Atmosphere | Closed | Off | Insufficient pressure or Timeout |
| S4 | Tank-Atmosphere | Open | On | Excess pressure or Timeout |
| S5 | Tank-Atmosphere | Open | On | Timeout (Pressure Control) |
| S6 | Tank-Atmosphere | Open | Off | Insufficient pressure or Timeout |
| S7 | Tank-Reference Volume | Closed | On | Excess pressure or Timeout |
| S8 | Tank-Reference Volume | Closed | On | Timeout (Pressure Control) |
| S9 | Tank-Reference Volume | Closed | Off | Insufficient pressure or Timeout |
| S10 | Tank-Reference Volume | Open | On | Excess pressure or Timeout |
| S11 | Tank-Reference Volume | Open | On | Timeout (Pressure Control) |
| S12 | Tank-Reference Volume | Open | Off | Insufficient pressure or Timeout |
| S13 | Tank-Atmosphere | Open | Off | Timeout |
| S14 | Tank-Reference Volume | Closed | Off | Timeout |
| S15 | Tank-Atmosphere | Open | Off | Timeout |
| S16 | Tank-Atmosphere | Closed | Off | Timeout |

Fig. 5

$$A_{TL} = \cfrac{V_{Ref} \cdot (\Delta p_0 - \Delta p_1)}{\cfrac{\alpha \cdot \sqrt{p_{atm}} \cdot \sqrt{R_s \cdot T} \cdot (t_1 - t_0) \cdot \sqrt{\Delta p_0 - \Delta p_1}}{\cfrac{(\Delta p_4 - \Delta p_5) \cdot \sqrt{\Delta p_2 + \Delta p_3} \cdot (t_3 - t_2)}{(\Delta p_2 - \Delta p_3) \cdot \sqrt{\Delta p_4 + \Delta p_5} \cdot (t_5 - t_4)} - 1}}$$

$A_{TL}$ – surface area of total tank leakage, $\alpha$ – flow coefficient, $p_{atm}$ – atmospheric pressure, $R_S$ – specific gas constant, $T$ – temperature of gas in K, $V_{Ref}$ – internal volume or reference volume of the module $$V = \frac{\alpha \cdot d_{TL}^2 \cdot \pi \cdot (t_2 - t_3) \cdot \sqrt{\frac{R_s \cdot T}{2}}}{4 \cdot \left(\sqrt{\frac{\Delta p_3}{p_{atm}}} - \sqrt{\frac{\Delta p_2}{p_{atm}}}\right)}$$

Fig. 6

MODULE FOR DETECTING A LEAKAGE OF AN ARRANGEMENT

RELATED APPLICATIONS

The present application claims the benefit of and priority to German Patent Application No. 102021128688.3, entitled "Modul zur Erfassung einer Leckage einer Anordnung," filed Nov. 4, 2021, the entirety of which is incorporated by reference herein.

FIELD OF THE DISCLOSURE

The present disclosure is directed to systems and methods for detecting fluid leakage.

BACKGROUND

High requirements are set, in particular, for tank systems of motor vehicles relative to the tightness thereof in order to prevent the undesired escape of fuel or fuel vapors. To this end, diagnostic methods by which leakages can be detected have been disclosed in DE 197 02 584 C2, DE 197 55 401 C2 and DE 195 27 367 C2.

In some implementations, a pressure drop may be used to determine leakages of a tank system. For example, an overpressure may be applied to the volume to be examined and in which manner this overpressure is dissipated can be detected. From the results, it is possible to draw conclusions about the presence of a leakage and even the approximate size thereof.

In such implementations, it is a drawback that the measurement results thereof lead to relatively inaccurate estimates of the leakage sizes. Thus it is possible to determine a leakage size which is too large according to the available measurement results, whilst the leakage size which is actually present would still meet a permitted limit value. Thus misdiagnoses can occur.

Accordingly, such implementations are unable to accurately detect and/or quantify a leakage of an arrangement which has a large sealed volume, in a reliable manner with a compact device.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

According to the systems and methods described herein, it has been initially identified that a module for detecting a leakage has to be provided with a reference volume which can be sealed in a fluid-tight manner in order to be able to carry out a separate diagnosis of the module. Thus it is possible to test whether the module itself introduces a leakage into an arrangement to be tested.

It has also been identified that pressure ratios and the temporal progressions thereof can be selectively detected in a small volume and in a correspondingly large volume by a reference volume which can be selectively connected to a tank or disconnected therefrom, by a compact device, namely the module, being able to be integrated in an existing system.

It has also been identified that by means of the pressure sensor it is not only possible to detect the pressure or the temporal progression of a pressure drop or a pressure increase in the reference volume but at the same time the pressure ratios in a tank which is connected to the tank connection as a large volume.

It has also been identified that pressures can be selectively set by the pump at different positions of the valves used in the module. The surface area of a leakage, namely the surface area through which the fluid can flow from a volume of an arrangement, can be determined from the pressure ratios and the temporal progressions thereof by considering a reference aperture.

By means of the systems and methods described herein, the diameter of the surface area of a leakage can be determined with an accuracy of plus-minus 15%.

In a first position of the valve, the tank connection could be connected via an atmosphere outlet to the atmosphere and disconnected from the reference volume, and in a second position the tank connection could be connected to the reference volume and disconnected from the atmosphere outlet. Thus a tank is able to be connected to the reference volume or disconnected therefrom by means of simply one valve. The tank can also be vented by connecting the tank connection to the atmosphere. Advantageously, the valve is thus designed as a changeover valve.

The reference volume could be connectable in a flow-conducting manner to the atmosphere outlet by means of a shut-off valve, wherein a flow line which extends from the reference volume to the atmosphere outlet is provided, the reference aperture with a defined flow cross section being provided therein. A throttle action can be achieved by the reference aperture when fluid flows out into the atmosphere. The throttle action is able to be set by setting the flow cross section. When the shut-off valve is open, the reference volume can be vented. It is also conceivable additionally to vent the tank by opening the shut-off valve.

The atmosphere outlet could lead into a filter through which fluid can flow out into the atmosphere. The filter is preferably designed as a dust filter. Thus it is possible to prevent dust from the environment from penetrating into the module and/or into the tank.

A check valve which prevents a return flow from the reference volume to the pump could be arranged between the reference volume and the pump. Thus a pressure in the reference volume can be reliably maintained when the pump is switched off A separate diagnosis of the module is simplified. Leakages of the reference volume, the check valve, the shut-off valve, the pressure sensor and/or the changeover valve can be determined. A further advantage of the structural arrangement of the check valve is that the pump does not have to be "leakproof", i.e. the pump does not have to start up against pressure.

Moreover, the advantage is provided by the check valve that pressures can settle to a constant value and are then able to be kept constant. Against this background, it has to be considered that initially a higher pressure is built up, but after the reaction and expansion of all of the parts of the pressurized system this pressure settles to a constant, probably lower, value.

The module could have a base body which has a tank connection for flange-mounting onto an arrangement comprising a tank, wherein the base body has an atmosphere outlet for draining fluid into the atmosphere and wherein the base body has a module control device with an interface for connecting to the electronics system of a motor vehicle or a different system, in order to output information about a leakage. Such a module can be adapted to any tank system and flange-mounted as a separate compact device. The module is an autonomous structural unit and requires no elements such as valves, measuring orifices, measuring pipes, or pressure sensors in the motor vehicle itself. Moreover, the module control device ensures an integration of the electronics system for controlling the measuring sequence and for evaluating the measurement inside the module. The module control device preferably provides only complete information to the electronics system of the motor vehicle or to an on-board computer.

It is possible that the module could be flange-mounted specifically onto an active carbon filter which is connected to a tank.

The module described herein can also be used outside automotive applications, for example in the industrial sector, in which leakages of containers have to be determined and detected.

An arrangement comprising a module of the type described herein could also comprise a tank of a motor vehicle which is connected to the tank connection by the interposition of an active carbon filter, wherein a line which can be shut or opened by a regeneration valve leads from the active carbon filter to the engine of the motor vehicle. Optionally a valve for holding back fuel vapors is arranged in the line which leads from the tank to the active carbon filter. Regeneration valves are used for degassing or venting the active carbon filter of the motor vehicle. Valves of this type are used for metering fuel vapor from the active carbon filter of the motor vehicle. In such an arrangement, a method can be carried out for detecting a leakage of the arrangement.

Against this background, a method for detecting a leakage in an arrangement comprising a tank could be carried out by using a module of the type described herein, in which at least one pressure drop is measured in a volume which comprises the reference volume and the tank. The module can be subjected to a separate diagnosis so that after establishing the tightness thereof a surface area through which fluid can flow inside the arrangement, in particular of the tank, can be determined. Within the course of the separate diagnosis, a leakage measurement is carried out of the reference volume in order to ensure that the changeover valve is in the correct position after the measuring sequence and thus the connection between the tank and the atmosphere is ensured.

A method, namely a diagnosis method, of the following types could be carried out by the module. The method could comprise the following steps:
  detecting a first pressure drop by means of the pressure sensor when the reference volume at overpressure is connected to the atmosphere and fluid flows out of the reference volume into the atmosphere via the reference aperture,
  detecting a second pressure drop in the reference volume which is at overpressure and which is connected to the tank,
  detecting a third pressure drop, wherein a fluid-conducting connection is present between the reference volume at overpressure, the tank connected thereto and the atmosphere, so that fluid coming from the tank and/or from the reference volume can flow out into the atmosphere via the reference aperture.

In each case, a pressure drop measurement is carried out by each step so that a pressure drop is measured three times by the method.

The first pressure drop takes place by the outflow of fluid from the reference volume via the reference aperture, the second pressure drop takes place by the outflow of fluid from the reference volume and the volume of the tank via a surface area of a leakage to be determined, and the third pressure drop takes place by the outflow of fluid from the reference volume and the volume of the tank via a surface area of a leakage to be determined and the reference aperture. In particular, when the reference aperture is known, wherein this knowledge is not necessarily required, the size of the surface area of the leakage can be determined in this manner. Preferably, the diameter of the reference aperture ranges from 0.1 mm to 0.8 mm.

The method could also comprise the following steps, in which substantially the second pressure drop measurement of the above-described method is used for the leakage detection:
  producing a fluid-conducting connection between the tank and the atmosphere when the reference volume is disconnected from the atmosphere and from the tank when the pump is switched off,
  producing a fluid-conducting connection between the reference volume and the tank by disconnecting the connection of the tank to the atmosphere, wherein a pressure in the reference volume and in the tank is built up when the pump is switched on,
  keeping the pressure constant when the pump is switched on,
  switching off the pump and testing by means of the pressure sensor whether a pressure drop takes place via a leakage of the arrangement or the tank,
  disconnecting the fluid-conducting connection between the reference volume and the tank by producing a fluid-conducting connection between the tank and the atmosphere and producing a fluid-conducting connection between the reference volume and the atmosphere when the pump is switched off, disconnecting the fluid-conducting connection between the reference volume and the atmosphere and producing a fluid-conducting connection between the tank and the reference volume by disconnecting the fluid-conducting connection of the tank to the atmosphere, so that a pressure increase is produced in the reference volume and in the tank by the evaporation of the fluid when the pump is switched off, disconnecting the fluid-conducting connection between the reference volume and the tank by producing a fluid-conducting connection between the tank and the atmosphere so that the tank is vented when the pump is switched off, and producing a fluid-conducting connection between the reference volume and the atmosphere when the pump is switched off, disconnecting the fluid-conducting connection between the reference volume and the atmosphere and determining an offset of the pressure sensor when the pump is switched off.

In this manner a shortened method can be carried out.

A very accurate method for detecting a leakage of an arrangement comprising a tank could comprise the following steps:

producing a fluid-conducting connection between the tank and the atmosphere when the reference volume is disconnected from the atmosphere and from the tank when the pump is switched off, building up a pressure in the reference volume which is disconnected from the tank and the atmosphere in a fluid-tight manner when the pump is switched on, testing the tightness of the reference volume and the module by means of the pressure sensor when the pump is switched off, producing a fluid-conducting connection between the reference volume and the atmosphere so that fluid can flow out into the atmosphere via the reference aperture when the pump is switched on, keeping constant the pressure which is built up by the switched-on pump against the reference aperture, switching off the pump and testing the pressure drop via the reference aperture by means of the pressure sensor, producing a fluid-conducting connection between the reference volume and the tank by disconnecting the connection both of the tank and of the reference volume to the atmosphere, so that fluid is no longer able to flow out into the atmosphere via the reference aperture, wherein a pressure is built up in the reference volume and in the tank when the pump is switched on, keeping the pressure constant when the pump is switched on, switching off the pump and testing by means of the pressure sensor whether a pressure drop takes place via a leakage of the arrangement or of the tank, producing a fluid-conducting connection between the reference volume, the tank and the atmosphere so that fluid coming from the tank and/or from the reference volume can flow out into the atmosphere via the reference aperture when the pump is switched on, wherein the pump builds up a pressure, keeping the pressure constant when the pump is switched on, switching off the pump, maintaining the fluid-conducting connection between the reference volume, the tank and the atmosphere, so that fluid coming from the tank and/or from the reference volume can flow out into the atmosphere via the reference aperture, disconnecting the fluid-conducting connection between the reference volume and the tank by producing a fluid-conducting connection between the tank and the atmosphere, so that fluid coming from the tank can flow out into the atmosphere and the tank is vented when the pump is switched off, disconnecting the fluid-conducting connection between the reference volume and the atmosphere and producing a fluid-conducting connection between the tank and the reference volume by disconnecting the fluid-conducting connection of the tank to the atmosphere, so that a pressure increase is produced in the reference volume and in the tank by the evaporation of the fluid when the pump is switched off, disconnecting the fluid-conducting connection between the reference volume and the tank by producing a fluid-conducting connection between the tank and the atmosphere, so that the tank is vented when the pump is switched off, and producing a fluid-conducting connection between the reference volume and the atmosphere when the pump is switched off, disconnecting the fluid-conducting connection between the reference volume and the atmosphere and determining an offset of the pressure sensor when the pump is switched off.

The aforementioned steps are preferably carried out one after the other. The method carries out three pressure drop measurements, the evaluation thereof always taking place in the same, approximately the same or substantially the same pressure range, so that a pressure-dependent measuring accuracy of the pressure sensor is eliminated.

In the aforementioned method, a pressure is kept constant during a pressure holding time with pressure control, so that the module and the arrangement can reach a stable state and settle at a stable pressure.

The first step of producing a fluid-conducting connection between the tank and the atmosphere when the reference volume is disconnected from the atmosphere and from the tank, when the pump is switched off, corresponds to the normal state of the module.

The step of disconnecting the fluid-conducting connection between the reference volume and the atmosphere and determining an offset of the pressure sensor, when the pump is switched off, serves for resetting the normal state of the module.

The method could preferably be carried out in a motor vehicle when the engine is not running. As a result, the method is able to be carried out particularly accurately and the surface area of the leakage is able to be determined particularly accurately. The diagnosis is only carried out by the method described herein when the tank cover is closed, a regeneration valve is closed, an optional FTIV, namely a valve for holding back fuel vapors, is open for a diagnosis of the entire system, or closed for a sub-space, and the engine is switched off. It is also conceivable, however, to carry out the method when the engine is running.

The surface area of the leakage of the arrangement could be determined and/or output quantitatively by the module. The gas volume in the tank can be calculated for testing the plausibility of the determined surface area of the leakage.

The diameter of a surface area of a leakage, in particular a surface area assumed to be round, could be detected with an accuracy of +/−15%. The module described herein is suitable for detecting the diameter with this accuracy.

Figure 1:
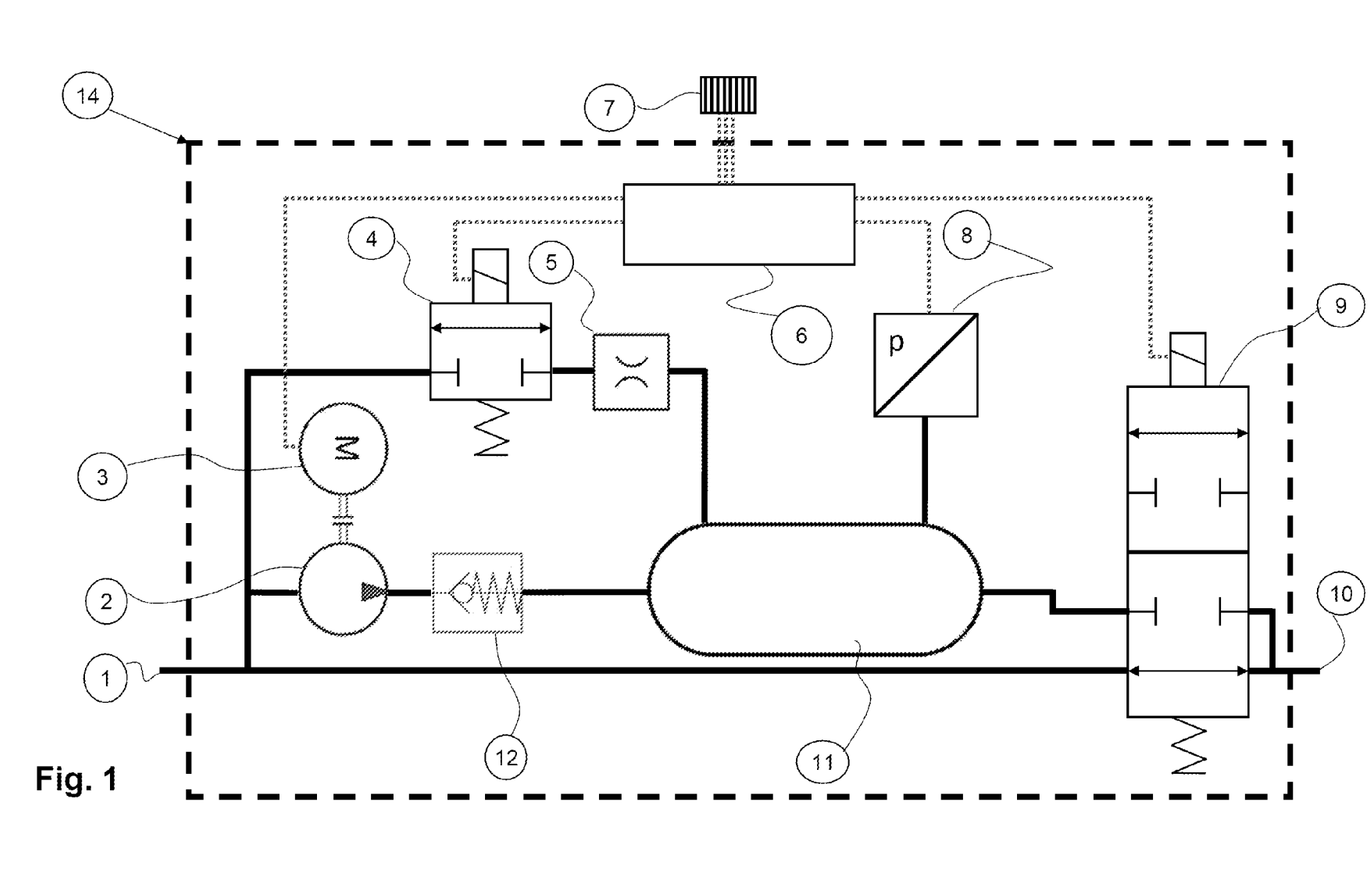
FIG. 1 shows a schematic view of a module which can be connected as a structural unit both mechanically and electronically to an arrangement of a tank system of a motor vehicle.

FIG. 1 shows a schematic view of a module which can be connected as a structural unit both mechanically and electronically to an arrangement of a tank system of a motor vehicle. Reference is made to the following elements:

1 Atmosphere outlet
2 Pump
3 Pump motor of 2
4 Shut-off valve
5 Reference aperture
6 Module control device
7 Interface of 6
8 Pressure sensor
9 Valve, changeover valve
10 Tank connection
11 Reference volume
12 Check valve
13 Filter
14 Module
15 Tank
16 Active carbon filter
17 Engine, internal combustion engine
18 Regeneration valve
19 FTIV FIG. 1 shows a module 14 for detecting a leakage comprising a pressure sensor 8 and a pump 2 for generating pressure.

The module 14 has a sealable reference volume 11 which can be connected in terms of flow by means of a valve 9 to a tank connection 10 and which can be disconnected therefrom in a flow-tight manner, wherein the pressure inside the reference volume 11 can be detected by the pressure sensor 8, wherein pressure can be generated inside the reference volume 11 by means of the pump 2, and wherein the reference volume 11 can be connected in a flow-conducting manner by means of a shut-off valve 4 via a reference aperture 5 with a defined flow cross section to an atmosphere outlet 1 and can be disconnected therefrom.

The reference volume preferably has a volume of between 20 and 100 ml. The tank connection 10 can be flange-mounted onto a tank 15 according to FIG. 2 or onto a line which comes therefrom. The pressure sensor 8 is connected to the reference volume 11 such that the pressure inside the reference volume 11 and in the tank 15 can be detected by the pressure sensor 8. The pump 2 is connected to the reference volume 11 such that pressure can be generated inside the reference volume and in the tank 15 by means of the pump 2. The pump 2 has a pump motor 3.

In a first position of the valve 9 the tank connection 10 is connected via an atmosphere outlet 1 to the atmosphere and disconnected from the reference volume 11, and in a second position the tank connection is connected to the reference volume 11 and disconnected from the atmosphere outlet 1. The valve 9 in this case is designed as a changeover valve.

The reference volume 11 is able to be connected in a flow-conducting manner by means of a shut-off valve 4 to the atmosphere outlet 1, wherein a flow line which extends from the reference volume 11 to the atmosphere outlet 1 is provided, wherein a reference aperture 5 with a diameter of between 0.1 mm and 0.8 mm is provided in the flow line. The flow line leads into a line by which the tank connection 10 is able to be connected to the atmosphere outlet 1. The reference aperture 5 is arranged between the shut-off valve 4 and the reference volume 11.

Figure 2:
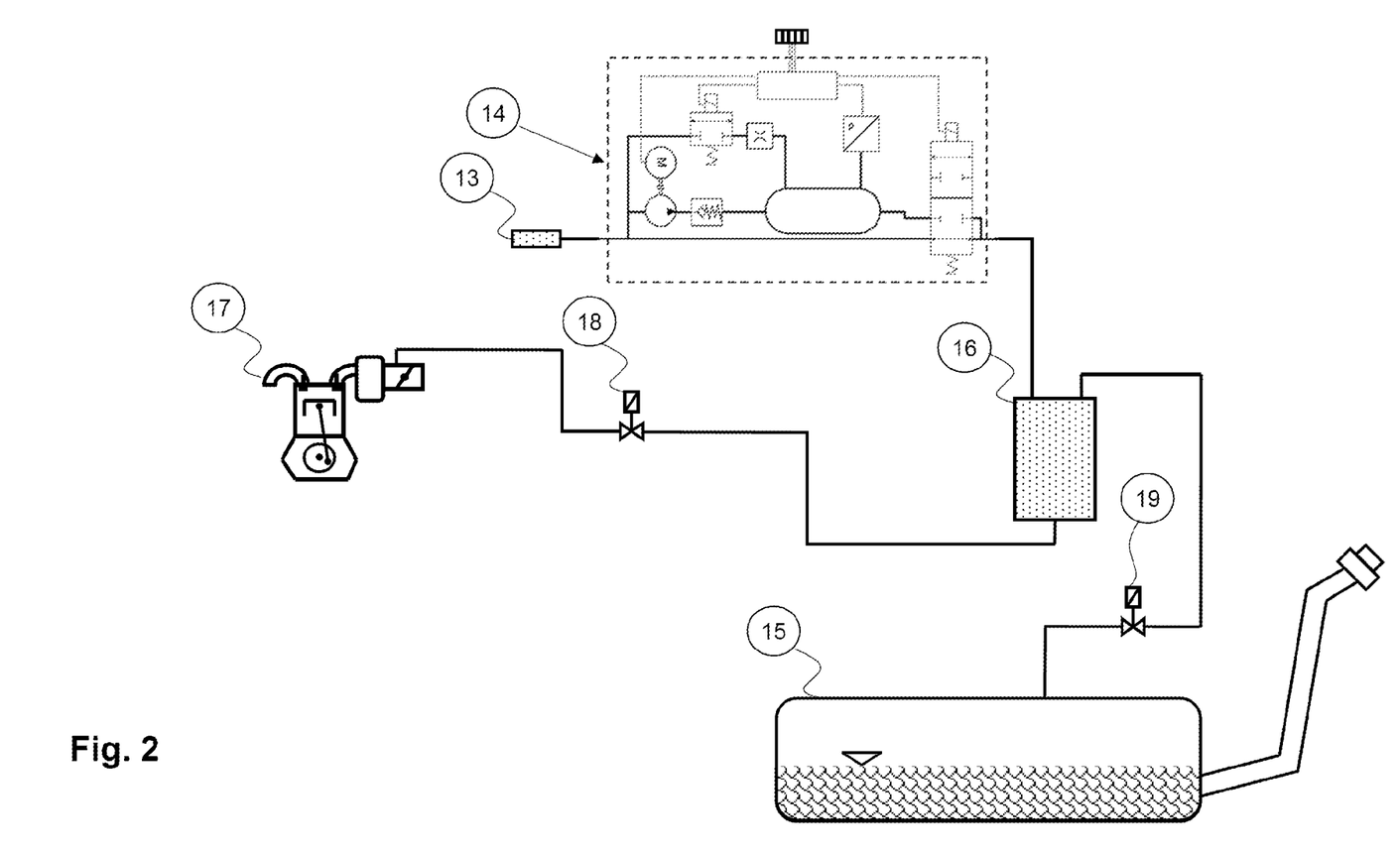
FIG. 2 shows an arrangement comprising a connected module according to FIG. 1.

FIG. 2 shows that the atmosphere outlet 1 leads into a filter 13, namely a dust filter, through which fluid can flow out into the atmosphere.

A check valve 12 which prevents a return flow from the reference volume 11 to the pump 2 is arranged between the reference volume 11 and the pump 2. Only four outflows for a fluid lead away from the reference volume 11. A first outflow leads to the reference aperture 5, a second outflow to the check valve or in the direction of the pump 2 and a third outflow to the tank connection 10. A fourth outflow terminates in the pressure sensor 8.

FIGS. 1 and 2 show that the module 14 has a base body which has a tank connection 10 for flange-mounting onto an arrangement comprising a tank 15. The tank connection 10 can be flange-mounted directly onto a tank 15 or directly onto a line leading therefrom, or the tank connection 10 can be flange-mounted onto a tank 15 by the interposition of an active carbon filter 16 as shown in FIG. 2.

The base body has an atmosphere outlet 1 for draining fluid into the atmosphere. The base body has a module control device 6 with an interface 7 for connecting to the electronics system of a motor vehicle or a different system, in order to output information about a leakage.

The module control device 6 comprises a measuring and control electronics system. The module control device 6 can output information that an excessive leakage is present or not. Optionally, the module control device 6 can also output the size of the surface area of the leakage as information.

FIG. 2 shows an arrangement comprising the module 14 and a tank 15 of a motor vehicle which is connected to the tank connection 10 by the interposition of an active carbon filter 16, wherein a line which can be shut or opened by a regeneration valve 18 leads from the active carbon filter 16 to the engine 17 of the motor vehicle.

A further line leads from the tank 15 to the active carbon filter 16, wherein an FTIV, namely a valve 19 for holding back fuel vapors, is arranged in this further line. Although an FTIV is shown in FIG. 2, this can also be dispensed with. The FTIV is an optional component.

In this regard, the further line with the FTIV leads from the tank 15 to the active carbon filter 16 and two lines lead from the active carbon filter 16, namely one via the regeneration valve 18 to the engine 17 and one to the module 14 which is able to be connected in a flow-conducting manner to the reference volume 11 via the valve 9.

The module 14 can be flange-mounted as a preassembled structural unit onto the arrangement comprising the tank 15. Preferably only three connections are present, a mechanical tank connection 10, a mechanical connection to the atmosphere, namely the atmosphere outlet 1, and an electronic connection which is represented by the interface 7.

Figure 4:
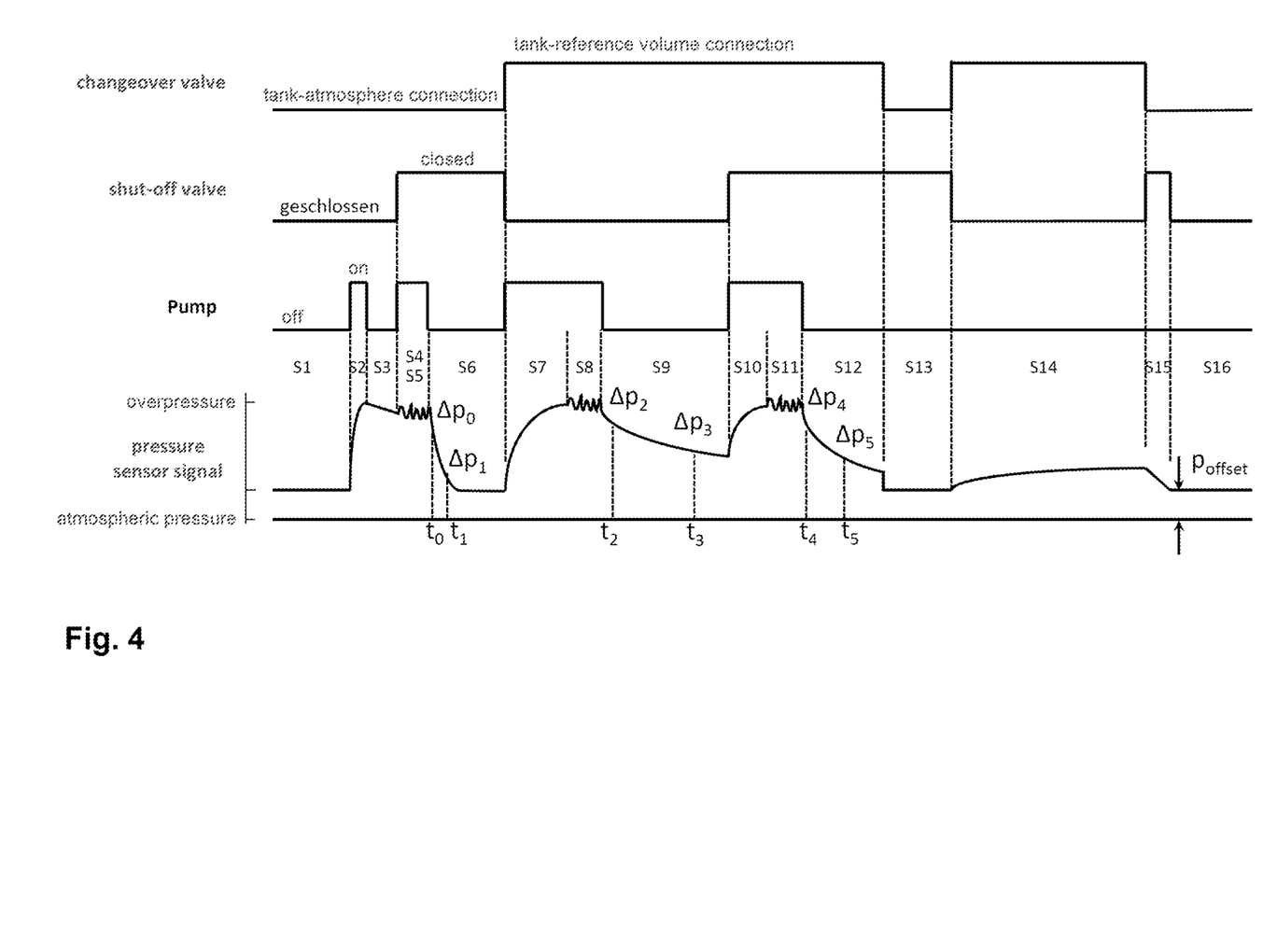
FIG. 4 shows a view of the sequence of a more accurate method for detecting a leakage of the arrangement according to FIG. 2.
Figure 5:
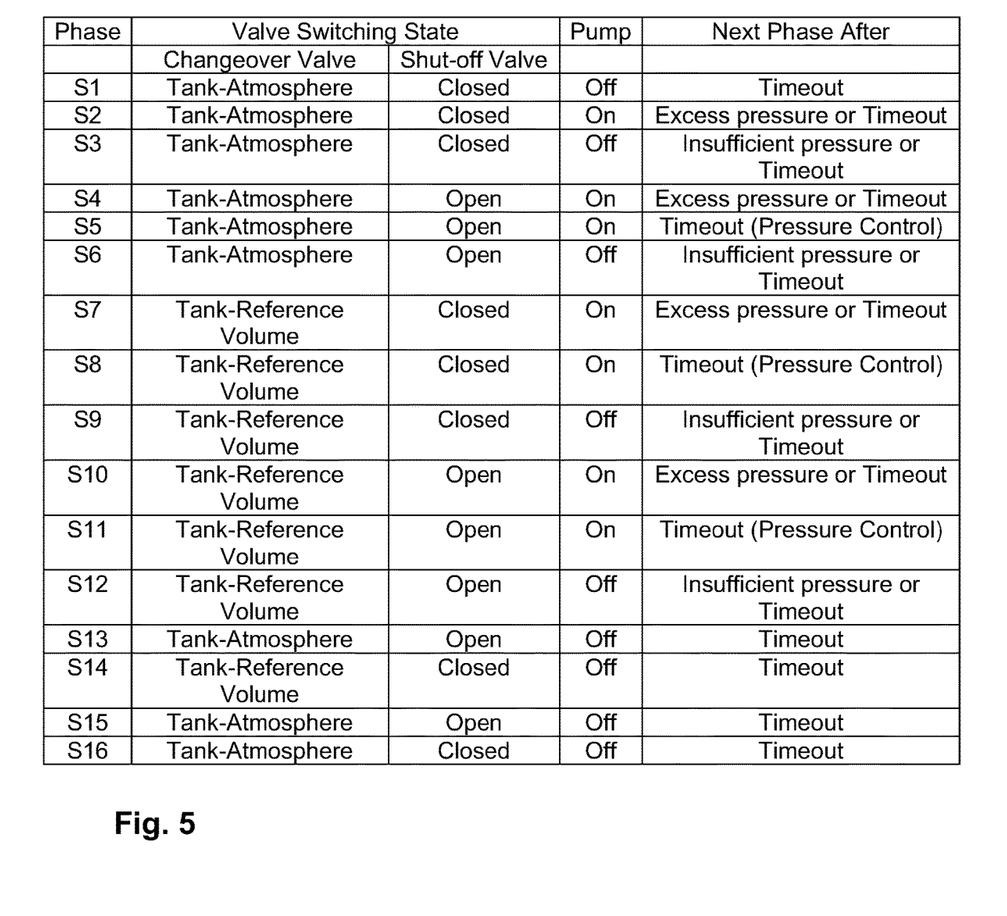
FIG. 5 shows a list of the steps of an accurate method for detecting a leakage according to FIG. 4, wherein the respective switching state of the relevant valves and the operating mode of the pump during the respective step and the respective ratios of the physical variables during the individual steps are indicated.

FIGS. 4 and 5 show schematically a method for detecting a leakage of an arrangement comprising a tank 15 by using the module 14 which comprises the following steps:

Step S1: producing a fluid-conducting connection between the tank 15 and the atmosphere when the reference volume 11 is disconnected from the atmosphere and from the tank 15 when the pump 2 is switched off. Step S1 shows the normal state in which the tank 15 is in contact with the atmosphere.

Step S2 shows the pressure built up by the pump 2. The pressure is built up in the reference volume 11 which is disconnected in a fluid-tight manner from the tank 15 and the atmosphere when the pump 2 is switched on. If no pressure is built up, the pump 2 is faulty. If the pressure is only built up slowly, the changeover valve is open or the voltage for the pump 2 is too low.

By means of step S3, a tightness of the reference volume 11 is measured. A testing of the tightness of the reference volume 11 and thus of the module 14 is carried out by means of pressure sensor 8 when the pump 2 is switched off. If the pressure drop is too high, the module 14 is untight. If the pressure drop is very high, the shut-off valve 4 is opened where possible.

By means of step S4, the shut-off valve 4 is opened and pressure is built up against the reference aperture 5. A fluid-conducting connection is produced between the reference volume 11 and the atmosphere, so that fluid can flow out into the atmosphere via the reference aperture 5 when the pump 2 is switched on. If the pressure does not drop, then the shut-off valve 4 is closed.

By means of step S5, after the pressure has settled, the pressure against the reference aperture 5 can be kept constant so that it is set to a constant value or a value which is as constant as possible. The pressure which is built up against the reference aperture 5 is kept constant by the pump 2 which is switched on. If the pump flow is too small, the reference aperture 5 is highly contaminated, since the pressure is regulated to a constant value.

By means of steps S2 to S5, a separate diagnosis of the module 14 is carried out, said diagnosis encompassing the testing of the pump 2, the valve 9, namely the changeover valve, the shut-off valve 4, the reference aperture 5 and the pressure sensor 8. The module 14 is tested as a whole.

In step S6, the pump 2 is switched off and the pressure drop via the reference aperture 5 is tested by means of the pressure sensor 8. By means of the pressure sensor 8, a pressure value $\Delta p_0$ is measured at the time $t_0$ and a pressure value $\Delta p_1$ is measured at the time $t_1$. The same takes place in steps S9 and S12. A pressure value is measured because a differential pressure sensor is used as a pressure sensor 8. A pressure drop is measured between two times or between two pressure values, namely two differential pressure values.

In step S7, a fluid-conducting connection is produced between the reference volume 11 and the tank 15 by disconnecting the connection both of the tank 15 and of the reference volume 11 to the atmosphere, so that a flow of fluid into the atmosphere via the reference aperture 5 is no longer possible, wherein a pressure in the reference volume 11 and in the tank 15 is built up when the pump 2 is switched on.

In step S8, the pressure is kept constant when the pump 2 is switched on.

In step S9, the pump 2 is switched off and it is tested by means of the pressure sensor 8 whether a pressure drop takes place via a leakage of the arrangement or the tank 15. By means of the pressure sensor 8, a pressure value $\Delta p_2$ is measured at the time $t_2$ and a pressure value $\Delta p_3$ is measured at the time $t_3$.

In step S10, a fluid-conducting connection is produced between the reference volume 11, the tank 15 and the atmosphere so that fluid coming from the tank 15 and/or from the reference volume 11 can flow out via the reference aperture 5 into the atmosphere when the pump motor 3 of the pump 2 is switched on, wherein the pump 2 builds up a pressure.

In step S11, the pressure is kept constant when the pump 2 is switched on or when the pump motor 3 is switched on.

In step S12, the pump 2 is switched off, maintaining the fluid-conducting connection between the reference volume 11, the tank 15 and the atmosphere, so that fluid coming from the tank 15 and/or from the reference volume 11 can flow out via the reference aperture 5 into the atmosphere. By means of the pressure sensor 8, a pressure value $\Delta p_4$ is measured at the time $t_4$ and a pressure value $\Delta p_5$ is measured at the time $t_5$.

By means of steps S6, S9 and S12, in each case a pressure drop is measured so that a pressure drop is measured three times by the method.

The first pressure drop takes place by fluid flowing out of the reference volume 11 via the reference aperture 5, the second pressure drop takes place by fluid flowing out of the reference volume 11 and the volume of the tank 15 via a surface area of a leakage to be determined, and the third pressure drop takes place by fluid flowing out of the reference volume 11 and the volume of the tank 15 via a surface area of a leakage to be determined and via the reference aperture 5.

In step S13, the fluid-conducting connection is disconnected between the reference volume 11 and the tank 15, producing a fluid-conducting connection between the tank 15 and the atmosphere so that fluid coming from the tank 15 can flow out into the atmosphere and the tank 15 is vented when the pump 2 is switched off.

By means of step S14, the fluid-conducting connection is disconnected between the reference volume 11 and the atmosphere and a fluid-conducting connection is produced between the tank 15 and the reference volume 11, disconnecting the fluid-conducting connection of the tank 15 to the atmosphere, so that a pressure increase is produced in the reference volume 11 and in the tank 15 by the evaporation of the fluid when the pump 2 is switched off. Step S14 thus describes a pressure increase due to evaporation.

Step S15 describes a disconnection of the fluid-conducting connection between the reference volume 11 and the tank 15, producing a fluid-conducting connection between the tank 15 and the atmosphere, so that the tank 15 is vented when the pump 2 is switched off, and the production of a fluid-conducting connection between the reference volume 11 and the atmosphere when the pump 2 is switched off. Step S15 thus describes a venting.

In step S16, the fluid-conducting connection is disconnected between the reference volume 11 and atmosphere and an offset of the pressure sensor 8 is determined when the pump 2 is switched off.

The method described herein is carried out in a motor vehicle when the engine 17, which is an internal combustion engine, is not running.

Figure 6:
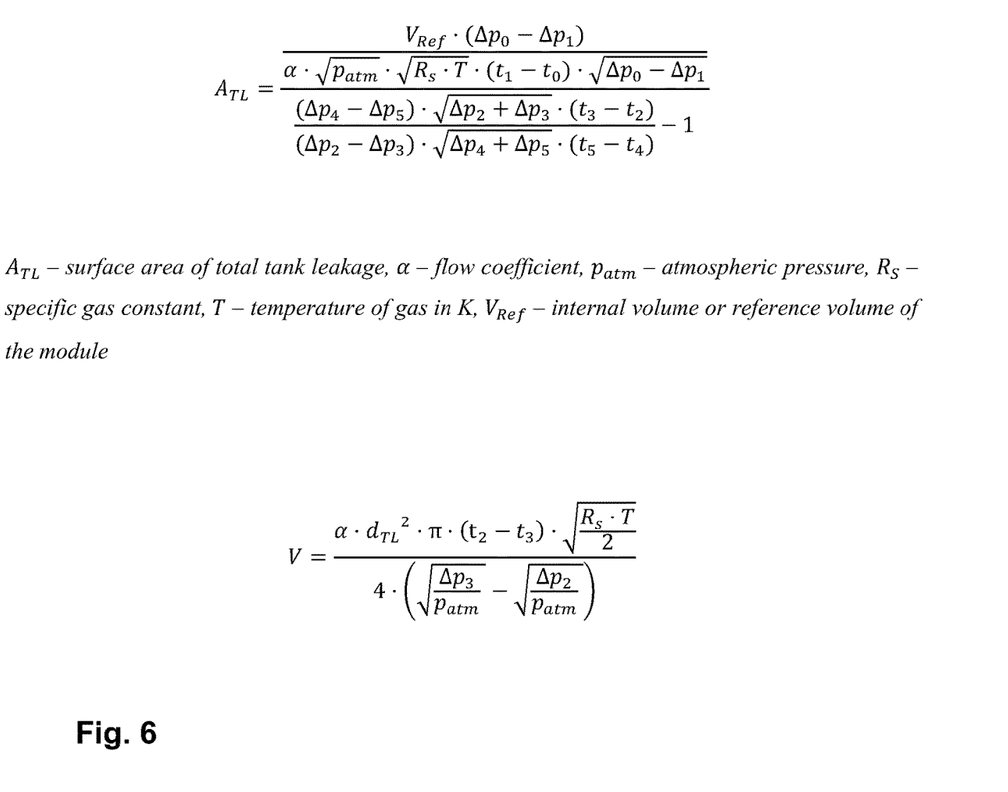
FIG. 6 shows a view of the formulae which are used when determining and testing the size of the leakage.

The surface area of the leakage of the arrangement is determined quantitatively by the module 14 and transmitted via the interface 7 to the electronics system of the motor vehicle. For the quantitative determination of the surface area, the following formula can be used, which is also shown in FIG. 6:

Surface area of the leakage:

$$A_{TL} = \frac{V_{Ref} \cdot (\Delta p_0 - \Delta p_1)}{\frac{\alpha \cdot \sqrt{p_{atm}} \cdot \sqrt{R_s \cdot T} \cdot (t_1 - t_0) \cdot \sqrt{\Delta p_0 - \Delta p_1}}{\frac{(\Delta p_4 - \Delta p_5) \cdot \sqrt{\Delta p_2 + \Delta p_3} \cdot (t_3 - t_2)}{(\Delta p_2 - \Delta p_3) \cdot \sqrt{\Delta p_4 + \Delta p_5} \cdot (t_5 - t_4)} - 1}}$$

$A_{TL}$—surface area of total tank leakage, $\alpha$—flow coefficient, $p_{atm}$—atmospheric pressure, $R_S$—specific gas constant, T—temperature of fluid or gas in K, $V_{Ref}$—internal volume or reference volume 11 of the module 14

The flow coefficient is a parameter via which all losses which occur when a fluid flows through an aperture are considered.

The values for $\Delta p$ and t, i.e. the pressure values which are measured in the context of pressure drops at specific times, and the times of their measurement associated therewith, may be derived from FIG. 4.

The method described above is carried out when the tank contents is constant, wherein the level of fuel in the tank 15 does not change.

Figure 3:
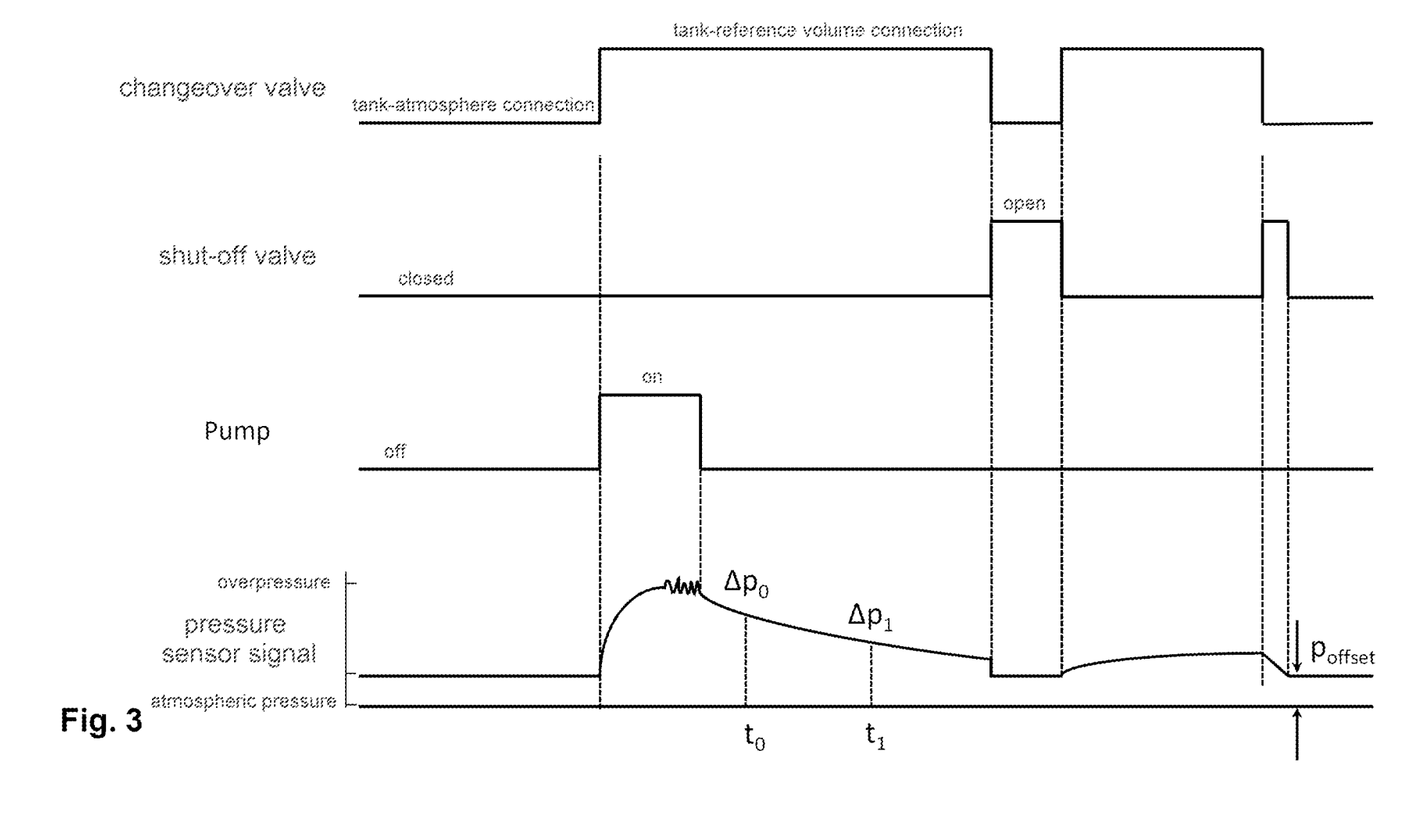
FIG. 3 shows a view of the sequence of a shortened method for detecting a leakage of the arrangement according to FIG. 2.

A shortening of the time for the described method or the diagnosis of the module 14 and/or the arrangement could be implemented by carrying out just one pressure drop measurement, namely the second according to FIG. 4, as shown in FIG. 3.

The values $\Delta p_0$ and $\Delta p_1$ in FIG. 3 correspond to the values $\Delta p_2$ and $\Delta p_3$ in FIG. 4. The two other pressure drop measurements of FIG. 4 are not carried out in the method according to FIG. 3.

When the worst case scenario is assumed by approximation, namely that the gas volume in the tank 15 is at a maximum, wherein the diameter $d_{TL}$ of an imaginary round surface area of the leakage is <<0.5 mm, it can be determined whether the diameter of the surface area of the leakage of the tank is <<0.5 mm.

The single measured pressure drop takes place by fluid flowing out from the reference volume 11 and the volume of the tank 15 over a surface area of a leakage in the tank 15. At the end of this method it should be tested whether the valve 9, namely the changeover valve, is closed again by the pressure build up in the reference volume 11.

The determined surface area of the leakage can be subjected to a plausibility test.

The following simplified formula provides the calculated or estimated current gas volume V in the tank 15:

$$V = \frac{\alpha \cdot d_{TL}^2 \cdot \pi \cdot (t_2 - t_3) \cdot \sqrt{\frac{R_s \cdot T}{2}}}{4 \cdot \left( \sqrt{\frac{\Delta p_3}{p_{atm}}} - \sqrt{\frac{\Delta p_2}{p_{atm}}} \right)}$$

Thus it is possible to compare the currently measured gas volume with the currently displayed filling level of the on-board computer of the motor vehicle, and to subject the measured result for the surface area of the leakage to a plausibility test.

The method described herein and the diagnoses associated therewith are also possible by using negative pressure. If generating pressure is discussed in this description, it is optionally also conceivable to generate negative pressure.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed:

1. A module for detecting a leakage, comprising
a pressure sensor; and
a pump for generating pressure; wherein
the module has a sealable reference volume which can be connected in terms of flow by means of a first valve to a tank connection and which can be disconnected therefrom in a flow-tight manner, wherein the pressure inside the reference volume can be detected by the pressure sensor, wherein pressure can be generated inside the reference volume by means of the pump and wherein the reference volume can be connected in a flow-conducting manner by means of a shut-off valve via a reference aperture with a defined flow cross section to an atmosphere outlet and can be disconnected therefrom,
and wherein:
in a first position of the first valve, the tank connection is connected via an atmosphere outlet to the atmosphere and disconnected from the reference volume, and
in a second position of the first valve, the tank connection is connected to the reference volume and disconnected from the atmosphere outlet.

2. The module as claimed in claim 1, further comprising a flow line which extends from the reference volume to the atmosphere outlet, the reference aperture with the defined flow cross section being provided therein.

3. The module as claimed in claim 1, wherein the atmosphere outlet leads into a filter through which fluid can flow out into the atmosphere.

4. The module as claimed in claim 1, further comprising a check valve, which prevents a return flow from the reference volume to the pump, arranged between the reference volume and the pump.

5. The module as claimed in claim 1, further comprising a base body which has a tank connection for flange-mounting onto an arrangement comprising a tank, wherein the base body has an atmosphere outlet for draining fluid into the atmosphere and wherein the base body has a module control device with an interface for connecting to the electronics system of a motor vehicle or a different system, in order to output information about a leakage.

6. An arrangement comprising:
a module comprising a pressure sensor, and
a pump for generating pressure, wherein
the module has a sealable reference volume which can be connected in terms of flow by means of a valve to a tank connection and which can be disconnected therefrom in a flow-tight manner, wherein the pressure inside the reference volume can be detected by the pressure sensor, wherein pressure can be generated inside the reference volume by means of the pump and wherein the reference volume can be connected in a flow-conducting manner by means of a shut-off valve via a reference aperture with a defined flow cross section to an atmosphere outlet and can be disconnected therefrom; and
a tank of a motor vehicle which is connected to the tank connection by the interposition of an active carbon filter, wherein a line which can be shut or opened by a regeneration valve leads from the active carbon filter to an engine of the motor vehicle.

7. A method for detecting a leakage of an arrangement comprising a tank, comprising:
measuring at least one pressure drop in a volume which comprises a sealable reference volume and the tank, using a module comprising a pressure sensor and a pump for generating pressure, wherein the module has the sealable reference volume which can be connected in terms of flow by means of a valve to a tank connection and which can be disconnected therefrom in a flow-tight manner, wherein the pressure inside the reference volume can be detected by the pressure sensor, wherein pressure can be generated inside the reference volume by means of the pump and wherein the reference volume can be connected in a flow-conducting manner by means of a shut-off valve via a reference aperture with a defined flow cross section to an atmosphere outlet and can be disconnected therefrom;

wherein measuring the at least one pressure drop comprises:
  producing a fluid-conducting connection between the tank and the atmosphere when the reference volume is disconnected from the atmosphere and from the tank when the pump is switched off;
  producing a fluid-conducting connection between the reference volume and the tank by disconnecting the connection of the tank to the atmosphere, wherein a pressure in the reference volume and in the tank is built up when the pump is switched on;
  keeping the pressure constant when the pump is switched on;
  switching off the pump and testing by means of the pressure sensor whether a pressure drop takes place via a leakage of the arrangement or the tank;
  disconnecting the fluid-conducting connection between the reference volume and the tank by producing a fluid-conducting connection between the tank and the atmosphere and producing a fluid-conducting connection between the reference volume and the atmosphere when the pump is switched off;
  disconnecting the fluid-conducting connection between the reference volume and the atmosphere and producing a fluid-conducting connection between the tank and the reference volume by disconnecting the fluid-conducting connection of the tank to the atmosphere, so that a pressure increase is produced in the reference volume and in the tank by an evaporation of the fluid when the pump is switched off;
  disconnecting the fluid-conducting connection between the reference volume and the tank by producing a fluid-conducting connection between the tank and the atmosphere so that the tank is vented when the pump is switched off, and producing a fluid-conducting connection between the reference volume and the atmosphere when the pump is switched off; and
  disconnecting the fluid-conducting connection between the reference volume and the atmosphere and determining an offset of the pressure sensor when the pump is switched off.

8. The method as claimed in claim 7, wherein measuring the at least one pressure drop comprises:
  detecting a first pressure drop by means of the pressure sensor when the reference volume at overpressure is connected to the atmosphere and fluid flows out of the reference volume into the atmosphere via the reference aperture;
  detecting a second pressure drop in the reference volume which is at overpressure and which is connected to the tank; and
  detecting a third pressure drop, wherein a fluid-conducting connection is present between the reference volume at overpressure, the tank connected thereto and the atmosphere, so that fluid coming from the tank and/or from the reference volume can flow out into the atmosphere via the reference aperture.

9. The method as claimed in claim 7, wherein measuring the at least one pressure drop comprises:
  producing a fluid-conducting connection between the tank and the atmosphere when the reference volume is disconnected from the atmosphere and from the tank when the pump is switched off;
  building up a pressure in the reference volume which is disconnected from the tank and the atmosphere in a fluid-tight manner when the pump is switched on;
  testing the tightness of the reference volume and the module by means of the pressure sensor when the pump is switched off;
  producing a fluid-conducting connection between the reference volume and the atmosphere so that fluid can flow out into the atmosphere via the reference aperture when the pump is switched on;
  keeping constant the pressure which is built up by the switched-on pump against the reference aperture;
  switching off the pump and testing the pressure drop via the reference aperture by means of the pressure sensor;
  producing a fluid-conducting connection between the reference volume and the tank by disconnecting the connection both of the tank and of the reference volume to the atmosphere, so that fluid is no longer able to flow out into the atmosphere via the reference aperture, wherein a second pressure is built up in the reference volume and in the tank when the pump is switched on;
  keeping the pressure constant when the pump is switched on;
  switching off the pump and testing by means of the pressure sensor whether a pressure drop takes place via a leakage of the arrangement or of the tank;
  producing a fluid-conducting connection between the reference volume, the tank and the atmosphere so that fluid coming from the tank and/or from the reference volume can flow out into the atmosphere via the reference aperture when the pump is switched on, wherein the pump builds up a pressure;
  keeping the pressure constant when the pump is switched on;
  switching off the pump, maintaining the fluid-conducting connection between the reference volume, the tank and the atmosphere, so that fluid coming from the tank and/or from the reference volume can flow out into the atmosphere via the reference aperture, disconnecting the fluid-conducting connection between the reference volume and the tank by producing a fluid-conducting connection between the tank and the atmosphere, so that fluid coming from the tank can flow out into the atmosphere and the tank is vented when the pump is switched off;
  disconnecting the fluid-conducting connection between the reference volume and the atmosphere and producing a fluid-conducting connection between the tank and the reference volume by disconnecting the fluid-conducting connection of the tank to the atmosphere, so that a pressure increase is produced in the reference volume and in the tank by an evaporation of the fluid when the pump is switched off;
  disconnecting the fluid-conducting connection between the reference volume and the tank by producing a fluid-conducting connection between the tank and the atmosphere, so that the tank is vented when the pump is switched off, and producing a fluid-conducting connection between the reference volume and the atmosphere when the pump is switched off; and disconnecting the fluid-conducting connection between the reference volume and the atmosphere and determining an offset of the pressure sensor when the pump is switched off.

10. The method of claim 7, wherein measuring the at least one pressure drop further comprises measuring the at least one pressure drop in a motor vehicle when an engine is not running.

11. The method of claim 7, wherein a surface area of a leakage of the arrangement is determined and/or output quantitatively by the module.

12. The method of claim 7, wherein the diameter of a surface area of a leakage is detected with an accuracy of +/−15%.

* * * * *